US012757275B2

United States Patent

Zhang et al.

(10) Patent No.: US 12,757,275 B2
(45) Date of Patent: Oct. 6, 2026

(54) METHOD PERFORMED BY USER EQUIPMENT AND USER EQUIPMENT

(71) Applicant: SHARP KABUSHIKI KAISHA, Sakai City (JP)

(72) Inventors: Chongming Zhang, Shanghai (CN); Renmao Liu, Shanghai (CN)

(73) Assignee: SHARP KABUSHIKI KAISHA, Sakai City (JP)

(*) Notice: Subject to any disclaimer, the term of this patent is extended or adjusted under 35 U.S.C. 154(b) by 261 days.

(21) Appl. No.: 18/727,852

(22) PCT Filed: Jan. 10, 2023

(86) PCT No.: PCT/CN2023/071613
§ 371 (c)(1),
(2) Date: Jul. 10, 2024

(87) PCT Pub. No.: WO2023/134679
PCT Pub. Date: Jul. 20, 2023

(65) Prior Publication Data

US 2025/0106923 A1 Mar. 27, 2025

(30) Foreign Application Priority Data

Jan. 14, 2022 (CN) ......................... 202210046305.0

(51) Int. Cl.
*H04W 76/18* (2018.01)
*H04W 76/14* (2018.01)
*H04W 88/04* (2009.01)

(52) U.S. Cl.
CPC ........... *H04W 76/18* (2018.02); *H04W 76/14* (2018.02); *H04W 88/04* (2013.01)

(58) Field of Classification Search
None
See application file for complete search history.

(56) References Cited

U.S. PATENT DOCUMENTS

| | | | | |
|---|---|---|---|---|
| 12,335,841 B2 * | 6/2025 | Wang | H04W 76/14 | |
| 12,557,166 B2 * | 2/2026 | Wu | H04W 36/0055 | |
| 2023/0077496 A1 * | 3/2023 | Cheng | H04W 76/14 | 370/328 |
| 2023/0130286 A1 * | 4/2023 | Leng | H04W 36/00725 | 370/331 |

(Continued)

OTHER PUBLICATIONS

Lenovo et al., "Path switching in L2 U2N relay case", R2-2110302, 3GPP TSG-RAN WG2 Meeting #116 electronic Online, Nov. 1 to Nov. 12, 2021.

*Primary Examiner* — Eunsook Choi
(74) *Attorney, Agent, or Firm* — ScienBiziP, P.C.

(57) ABSTRACT

The present invention provides a method performed by user equipment, and user equipment. The method is a processing method performed during communication performed between the user equipment (UE) and a base station on the basis of a multi-path communication mode, and includes the following steps: receiving, by the UE, a radio resource control (RRC) message from the base station, the message carrying information used to instruct the UE to establish an indirect connection for communicating with the base station via relay UE; and upon receiving the RRC message, starting, by the UE, a timer, and establishing a sidelink (SL) connection or a PC5 connection with the relay UE.

5 Claims, 3 Drawing Sheets

(56) References Cited

U.S. PATENT DOCUMENTS

| | | | | |
|---|---|---|---|---|
| 2023/0328828 | A1* | 10/2023 | Wu | H04W 76/38 370/315 |
| 2024/0121677 | A1* | 4/2024 | Wu | H04W 36/0079 |
| 2024/0349379 | A1* | 10/2024 | Freda | H04W 40/22 |

* cited by examiner

METHOD PERFORMED BY USER EQUIPMENT AND USER EQUIPMENT

TECHNICAL FIELD

The present invention relates to the technical field of wireless communications. More specifically, the present invention relates to a method performed by user equipment, and corresponding user equipment.

BACKGROUND

In a cell covered by a base station, user equipment (UE) can directly communicate with the base station, and such a communication connection is called a direct connection. The UE may also be in communication connection with the base station via relay UE, and such a connection may be referred to as an indirect connection. In a scenario in which the UE communicates with the base station by means of the relay UE, the UE is called remote UE.

In order to improve uplink and downlink transmission rates and throughput of the UE, the UE may simultaneously operate in a direct connection mode and an indirect connection mode. As shown in FIG. 1, in such an operating mode, the UE and the base station communicate with each other via different paths, so that the operating mode may also be referred to as a multi-path communication mode.

In FIG. 1, a wireless communication mode is typically adopted between remote UE and a base station and between relay UE and the base station, for example, communication techniques and means such as 5G NR or LTE. Moreover, the remote UE and the relay UE may communicate with each other on the basis of a sidelink communication mode, or a Wi-Fi communication mode based on hotspot coverage, or a wired connection mode.

In order to implement the above multi-path communication mode, the base station needs to perform connection configuration and management for the UE, and needs to promptly sense and address issues that occur on any link/path, thereby ensuring communication quality. Therefore, how to configure and manage such a multi-path communication mode is a problem to be solved.

SUMMARY

In order to address the aforementioned issue, the present invention provides a method performed by user equipment, and user equipment, which can effectively configure and manage a multi-path communication mode, thereby ensuring communication quality.

According to an aspect of the present invention, provided is a method performed by user equipment, the method being a processing method performed during communication performed between user equipment (UE) and a base station on the basis of a multi-path communication mode, comprising the following steps:

receiving, by the UE, a radio resource control (RRC) message from the base station, the message carrying information used to instruct the UE to establish an indirect connection for communicating with the base station via relay UE; and upon receiving the RRC message, starting, by the UE, a timer, and establishing a sidelink (SL) connection or a PC5 connection with the relay UE.

In the above method performed by user equipment, preferably, when the SL connection or the PC5 connection between the UE and the relay UE is successfully established, the timer is stopped.

In the above method performed by user equipment, preferably, after the SL connection or the PC5 connection between the UE and the relay UE is successfully established, the UE transmits a connection establishment success indication or a path addition complete indication to the base station, and stops the timer.

In the above method performed by user equipment, preferably, if, when the timer expires, neither the SL connection nor the PC5 connection between the UE and the relay UE is successfully established or the UE has not transmitted a connection establishment success indication or a path addition complete indication, the UE initiates a failure information reporting procedure.

In the above method performed by user equipment, preferably, in the failure information reporting procedure, the UE generates a failure information message, and transmits the same to the base station, a path addition failure or an indirect connection establishment failure being indicated in the message; or, the UE generates a specific RRC message, and transmits the same to the base station, the specific RRC message being used to report a path addition failure or indicate an indirect connection establishment failure.

In the above method performed by user equipment, preferably, the timer is an existing T304 timer used to manage reconfiguration with sync.

In the above method performed by user equipment, preferably, if the UE detects that a radio link failure (RLF) has occurred on a connection between the UE and the relay UE, or an upper layer of the UE requests the UE to release the connection between the UE and the relay UE, or the UE receives a message from the relay UE, and it is indicated in the message that the relay UE has detected an RLF has occurred or the relay UE has been handed over, the UE performs at least one of the following operations:

suspending all radio bearers transmitted via a relay path;

initiating a failure information reporting procedure; and initiating a sidelink UE information reporting procedure.

In the above method performed by user equipment, preferably, the UE further determines whether SRB1 is located on the indirect connection, and further determines whether the UE is configured with split SRB1, and the UE initiates an RRC connection re-establishment procedure if SRB1 is not located on the indirect connection and the UE is not configured with split SRB1; and the UE performs the above operation if SRB1 is located on the indirect connection or the UE is configured with split SRB1.

In the above method performed by user equipment, preferably, when the UE detects that a failure has occurred between the UE and the base station, the UE further determines whether the UE is configured with split SRB1, and the UE initiates the failure information reporting procedure if the UE is configured with split SRB1; and the UE initiates the RRC connection re-establishment procedure if the UE is not configured with split SRB1.

According to another aspect of the present invention, user equipment is provided, comprising:

a processor; and a memory storing instructions, the instructions, when run by the processor, performing the method described above.

According to the method performed by user equipment and the corresponding user equipment to which the present invention relates, a multi-path communication mode can be effectively configured and managed, thereby ensuring communication quality.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment;
NR: New Radio;
LTE: Long Term Evolution;
eLTE: Enhanced Long-Term Evolution;
RRC: Radio Resource Control;
MAC: Medium Access Control (layer);
MAC CE: MAC Control Element;
SDAP: Service Data Adaptation Protocol;
SRAP: Sidelink Relay Adaptation Protocol;
RLC: Radio Link Control;
PDCP: Packet Data Convergence Protocol;
ADAPT: Adaptation Layer;
PHY: Physical Layer;
RB: Radio Bearer;
DRB: Data Radio Bearer;
SRB: Signaling Radio Bearer;
PDU: Protocol Data Unit;
SDU: Service Data Unit;
V2X: Vehicle-to-Everything.

In the present invention, a network, a base station, and a RAN may be used interchangeably. The network may be a Long Term Evolution (LTE) network, a new RAT (NR) network, an enhanced Long-Term Evolution (eLTE) network, or another network defined in a subsequent evolved version of the 3GPP.

In the present invention, user equipment (UE) may refer to an NR device that supports an NR sidelink relay function as described in the background, may also refer to an NR device that supports an NR sidelink relay architecture, and may also refer to an NR device or an LTE device of another type.

In the present invention, sidelink and PC5 may be used interchangeably, and an RLC channel, an RLC entity, and an RLC bearer may be used interchangeably. In addition, PC5 is used for relay operations herein, and can therefore also be replaced with relay.

Hereinafter, a description will be given of related art of the present invention.

Multi-Path Communication

Figure 1:
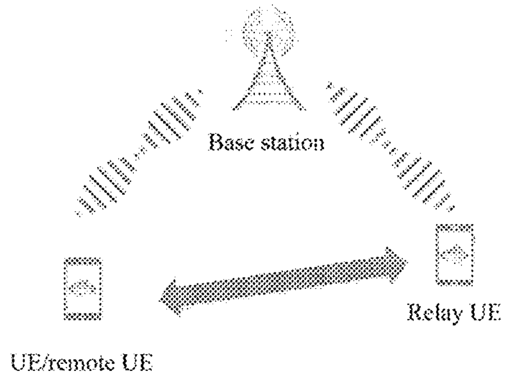
FIG. 1 is a schematic diagram showing an operating mode (multi-path) in which a direct connection and an indirect connection are parallel, i.e., a multi-path communication mode.

As shown in FIG. 1, UE and a base station may communicate with each other via a direct connection and an indirect connection. The UE may be configured to simultaneously operate in a communication mode of a direct connection and an indirect connection, and such a communication mode may be referred to as multi-path communication. A direct connection path may be referred to as a direct path, and an indirect connection path may be referred to as a relay path or an indirect path.

Specifically, as shown in FIG. 1, remote UE and relay UE are connected to the same base station, i.e., the same master node (MN). There may also be a case in which the remote UE and the relay UE are connected to different base stations, and the content of the present invention is also applicable, and is not limited herein.

The direct connection and the direct path are interchangeable herein. The indirect connection, the relay path, and the indirect path are interchangeable.

Multi-path communication may also be replaced herein with multi-connection communication.

Proximity Services (ProSe) Communication Between UE (UE to UE, U2U Communication)

A UE and a UE may be wirelessly connected to each other by using a proximity services communication means, so as to achieve transmission of data or signaling. The proximity services communication means mentioned herein primarily refers to a sidelink connection, or a Wi-Fi connection, or another connection means. A sidelink connection-based reference point between a UE unit and a UE unit is referred to as PC5, and therefore a sidelink-based connection between the UE may be referred to as a PC5 connection. Sidelink connection and PC5 connection are interchangeable herein. Such a PC5 connection may be identified by a pair of Layer-2 identities (IDs) typically including a source Layer-2 identity (ID) and a destination Layer-2 identity (ID). Such a PC5 connection may be simply referred to as a PC5 connection, a sidelink connection, or the like for or corresponding to a certain destination.

Sidelink Radio Link Failure (SL RLF)

In the following scenario, UE may determine that a radio link failure has occurred on a sidelink connection for a specific destination:

upon reception of an indication from a sidelink RLC entity that the maximum number of retransmissions for a specific destination has been reached;

upon expiry of a timer T400 for a specific destination;

upon reception of an indication from a MAC entity that the maximum number of consecutive HARQ DTX for a specific destination has been reached; or upon indication, from a PDCP entity concerning a sidelink signal radio bearer for a specific destination, that integrity check failure has occurred (upon integrity check failure indication from a sidelink PDCP entity concerning SL-SRB for a specific destination).

In a sidelink connection or a PC5 connection, one specific destination corresponds to one PC5 connection, therefore it can be considered that an SL RLF has occurred on a sidelink connection or a PC5 connection corresponding to the address.

UE-To-Network Relay (U2N Relay)

Figure 2:
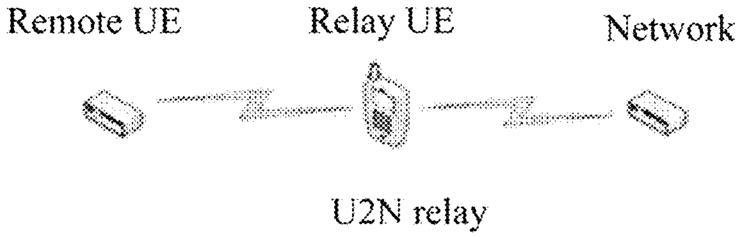
FIG. 2 is a schematic diagram showing UE-to-network relay.

As shown in FIG. 2, the left side is remote UE, the middle is relay UE, and the right side is a network. The remote UE and the relay UE may be connected to each other via the aforementioned PC5 interface, or Wi-Fi, or another connection means. The PC5 connection is mainly used as an example herein. The relay UE and the network may be connected via a Uu interface. The relay UE relays and forwards signaling and data between the remote UE and the base station.

Uu Interface

A wireless communication interface between UE and a base station. The UE may communicate with eNB over the Uu interface by using an E-UTRAN. The UE may also communicate with gNB over the Uu interface by using NR.

Uu Radio Link Failure (Uu RLF)

The UE may determine that a radio link failure is detected at the Uu interface in the following cases:

- a random access problem indication is received from MAC (upon random access problem indication);
- an indication that the maximum number of retransmissions has been reached is received from RLC (upon indication from RLC that the maximum number of retransmissions has been reached); and
- a timer T310 or T312 related to radio link detection expires (upon T310/T312 expiry).

RRC Connection Re-Establishment

In order to resume communication with the base station or the network side, the UE in the connected state needs to re-establish the RRC connection. To achieve the foregoing purpose, the UE performs an RRC connection re-establishment procedure. During initiation of the foregoing procedure, the UE starts a timer T311 for management of the connection resume procedure.

Timer T304

In the prior art, when the UE receives an RRC connection reconfiguration message from the base station, and the message instructs the UE to perform reconfiguration with sync or a handover/switch, the UE starts the timer T304 to manage the synchronization procedure. If the reconfiguration with sync is successfully completed, the UE stops T304. If T304 expires, this means that the reconfiguration with sync procedure fails, and the UE triggers the RRC connection re-establishment procedure in which the UE transmits an RRC re-establishment request (RRCReestablishmentRequest) message to the base station.

Signal Radio Bearer (SRB) and Split SRB

During communication between the UE and the base station, the SRB is used to bear signaling. The UE encapsulates, via a Uu PDCP layer, data of messages to the network for air interface RRC connection setup, re-establishment, resume, etc., and then submits the same to a Uu RLC entity to be further encapsulated, borne on a Uu RLC channel, and submitted downwards layer by layer via Uu-MAC and Uu-PHY. Conversely, an RRC message transmitted by the network to the UE also arrives at the UE via the SRB. Such an SRB may be referred to as an SRB via a direct connection or an SRB via a direct path.

Figure 3:
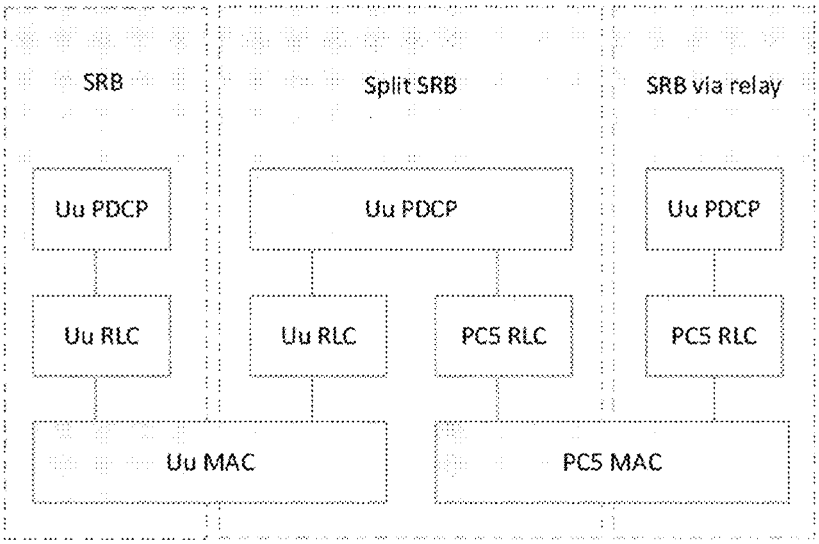
FIG. 3 is a schematic diagram showing protocol layer structures of an SRB and a split SRB.

In the multi-path configuration, the UE may be configured with a split SRB, the protocol structure of which is as shown in FIG. 3. After the Uu PDCP layer encapsulates data, the UE may submit the encapsulated data to Uu RLC or PC5 RLC as required. If the data is submitted to Uu RLC, processing is the same as that in the case of the SRB. If the data is submitted to PC5 RLC, the data is borne on a PC5 RLC channel after further encapsulation, submitted downwards layer by layer via PC5-MAC and PC5-PHY, and finally transmitted to the base station/network via a relay path. If the data is submitted to Uu RLC, as in the case of the SRB, the data is finally transmitted to the base station/network via a direct path. Such a split SRB may be referred to as a split SRB via a multi path or a split SRB via a relay path (split SRB via relay).

In the multi-path configuration, the UE may be further configured with an SRB via relay, the protocol structure of which is as shown in FIG. 3. After the Uu PDCP layer encapsulates data, the encapsulated data is submitted to a PC5 RLC entity to be further encapsulated, borne on a PC5 RLC channel, submitted downwards layer by layer via PC5 MAC and PC5 PHY, transmitted to relay UE, and is then forwarded to the network/base station. Conversely, an RRC message transmitted by the network to the UE may also arrive at the UE via an SRB via relay via the relay UE. Such an SRB via relay may also be referred to as an SRB via a relay path or an SRB via an indirect connection.

According to contents that are borne, signal radio bearers (SRBs) may be divided into the following types:

- SRB0: used to bear an RRC message transmitted using a logical channel of a common control channel (CCCH).
- SRB1: used to bear an RRC message and a non-access stratum (NAS) message transmitted using a logical channel corresponding to a dedicated control channel (DCCH).
- SRB2: a non-access stratum (NAS) message and an RRC message carrying measurement information transmitted using a logical channel corresponding to a dedicated control channel.

The method of the present invention is described below with reference to FIG. 4.

Figure 4:
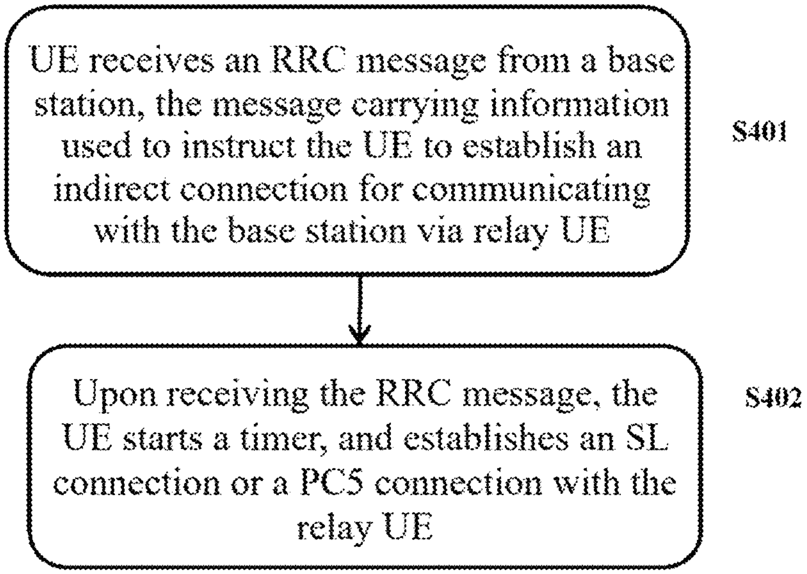
FIG. 4 is a flowchart showing a method performed by user equipment (UE) according to an embodiment of the present invention.

FIG. 4 is a flowchart of a processing method performed by UE according to an embodiment of the present invention.

Specific embodiments are provided below to describe a processing method of the present invention.

Embodiment 1

In the present embodiment, provided is a processing method performed during communication performed between UE and a base station on the basis of a multi-path communication mode, as shown in FIG. 4, including the following steps:

- S401: receiving, by the UE, an RRC message from the base station, the message carrying information used to instruct the UE to establish an indirect connection for communicating with the base station via relay UE; and
- S402: upon receiving the RRC message, starting, by the UE, a timer, and establishing an SL connection or a PC5 connection with the relay UE.

Specifically, the UE receives an RRC message, e.g., an RRC reconfiguration message, from the base station. The message may carry information for instructing the UE to establish an indirect connection. For example, the message includes information about the relay UE used for the indirect connection, includes at least a UE identity, e.g., an L2 ID, of the relay UE, and for example, may further include configuration information of path addition. On the basis of the configuration information, the UE may establish the path of the indirect connection, etc.

Upon receiving the above message, the UE may start a timer T-path addition. The timer is located on the UE side. A value of the duration of the timer may also be carried in the above message. That is, the UE may set the value for the timer T-path addition according to the value of the duration of T-path addition carried in the above message, and start the timer T-path addition.

Upon receiving the above message, the UE initiates establishment of a connection with the relay UE. Establishment of a PC5 connection is used herein as an example. The UE establishes a PC5 connection with the relay UE. However, as described above, a sidelink connection and a PC5 connection are interchangeable herein. That is, a sidelink connection is also applicable. The UE may also establish a connection with the relay UE via Wi-Fi.

When the PC5 connection between the UE and the relay UE is successfully established, the timer T-path addition is stopped. Alternatively, when the UE receives a PC5 RRC message, e.g., an SL RRC reconfiguration complete (RRCReconfigurationCompleteSidelink) message, transmitted by the relay UE, the timer T-path addition is stopped. Preferably, after the PC5 connection between the UE and the relay UE is successfully established, the UE may transmit, to the base station, a connection establishment success indication, or a path addition complete indication, or an RRC reconfiguration complete message (RRCReconfigurationComplete), and stop the timer T-path addition. The connection establishment success indication or the path addition complete indication and the RRC reconfiguration complete message described herein may be transmitted to the base station via a direct connection, or may be transmitted to the base station via an indirect connection.

In one case, if the PC5 connection between the UE and the relay UE is not successfully established, or the PC5 RRC message transmitted by the relay UE is not received, or the UE does not transmit the aforementioned indication information or reconfiguration complete message until expiry of the running timer T-path addition, the UE may initiate a failure information reporting procedure. In the procedure, the UE generates a failure information (FailureInformation) message, and optionally, information such as a path addition failure, an indirect connection establishment failure is indicated in the message. In addition, the message is submitted to a lower layer for transmission, so as to be transmitted to the base station.

Alternatively, the UE may generate a specific RRC message used to report a path addition failure or to indicate indirect connection establishment failure information, and submit the message to a lower layer for transmission to transmit the same to the base station.

An implementation of the timer T-path addition may be reusing the existing T304 timer (used to manage reconfiguration with sync).

When the UE receives the above RRC message carrying the information for instructing the UE to establish the indirect connection, the UE may start T304 (in this case, it may be considered that a reason for causing T304 to run is the establishment of an indirect connection or path addition).

When the PC5 connection between the UE and the relay UE is successfully established, the UE may stop T304, or stop the timer T304 under the aforementioned various conditions that cause the timer T-path addition to stop running.

If T304 expires, and the reason for causing T304 to run is the establishment of an indirect connection or path addition, the UE may initiate the aforementioned failure information reporting procedure to report a path addition failure.

When the UE communicates with the base station via the relay UE, the UE is referred to as remote UE.

Embodiment 2

U2N relay UE receives an RRC message, e.g., an RRC reconfiguration message, from a base station. The message may carry configuration information of remote UE including at least a UE identity, e.g., an L2 ID, of the remote UE.

Upon receiving the above message, the relay UE may start a timer T-remote for the remote UE. The timer is located on the relay UE side. A value of the duration of the timer may also be carried in the above message. That is, the relay UE may set the value for the timer T-remote according to the value of the duration of T-remote carried in the above message, and start the timer T-remote.

When a PC5 connection between the relay UE and the remote UE is successfully established, the relay UE stops the timer T-remote. Preferably, when the relay UE receives data or signaling, e.g., an SL RRC reconfiguration (RRCReconfigurationSidelink) message from the remote UE, the timer T-remote may be stopped. Alternatively, when the relay UE transmits an SL RRC reconfiguration complete (RRCReconfigurationCompleteSidelink) message to the remote UE, the timer T-remote may be stopped.

In one case, if the PC5 connection between the remote UE and the relay UE is not successfully established or none of the aforementioned cases that cause the timer T-remote to stop running occurs until expiry of the running timer T-remote, the relay UE may initiate an existing failure information reporting procedure. In the procedure, the UE generates a failure information (FailureInformation) message, and the message carries at least identification information of the remote UE, and optionally, indicates that establishment of the connection between the UE and the remote UE fails. In addition, the message is submitted to a lower layer for transmission, so as to be transmitted to the base station.

In the present embodiment, in order to distinguish from remote UE, it is emphasized that the present embodiment is performed on the relay UE side, and the relay UE is still UE in essence.

Embodiment 3

On the basis of Embodiment 1, if the UE detects that a failure, e.g., an SL RLF on a PC5 interface, has occurred on a connection between the UE and relay UE, or an upper layer (e.g., an application layer or a PC5 management layer) of the UE requests the UE to release the connection between the UE and the relay UE, or the UE receives a message from the relay UE, and it is indicated in the message that the relay UE has detected an RLF or the relay UE has been handed over (HO), the UE may perform a corresponding operation.

Specifically, when the remote UE detects that an SL-RLF has occurred on a connection between the remote UE and the relay UE, or an upper layer of the remote UE requests the remote UE to release a PC5-RRC connection between the remote UE and the relay UE, or the remote UE receives a message (e.g., a NotificationMessageSidelink message) from the relay UE, and it is indicated in the message that the relay UE has detected a Uu interface RLF or the relay UE has been handed over, the remote UE may perform one or more of the following operations:

Operation 1: the remote UE suspends all radio bearers transmitted via a relay path, which may include a radio signaling bearer or a data bearer. Alternatively, transmission of the signal radio bearers via the relay path is suspended.

Operation 2: the remote UE may initiate a failure information reporting procedure. In the procedure, the UE generates a failure information (FailureInformation) message, and optionally, information such as an SL-RLF having occurred on a link between the UE and the relay UE, or an indirect connection failure having occurred, or an indirect path failure is indicated in the message. In addition, the message is submitted to a lower layer for transmission, so as to be transmitted to the base station.

Operation 3: The remote UE may also perform a sidelink UE information reporting procedure (sidelink UE information for NR sidelink communication procedure), and transmit a sidelink UE information message to the base station/network side. The message includes a sidelink failure report list (sl-failure list), and a sidelink destination identity (sl-DestinationIdentity) therein is set to a relay UE identity carried in a broadcast message by the relay UE, or is set to a relay UE identity received by the remote UE and carried in an RRC reconfiguration message. The RRC reconfiguration message is the RRC message mentioned in Embodiment 1 and carrying the path addition configuration information.

In the transmitted sidelink UE information message, the remote UE may also set the sidelink destination identity (sl-DestinationIdentity) to an address identity configured by an upper layer and used for sidelink transmission, and add indication information indicating that the address identity corresponds to relay UE and preferably corresponds to U2N relay UE in multi-path. For example, an IE relay is set. When the destination identity corresponds to relay UE, the value of the IE relay is set to true or "1". When the destination identity does not correspond to the relay UE, the IE relay is not carried, or the value of the IE relay is set to false or "0".

Preferably, in order to enable the base station to identify that the destination identity reported in the above sidelink UE information message corresponds to relay UE, the remote UE may also initiate a sidelink UE information reporting procedure (sidelink UE information for NR sidelink communication procedure) when a PC5 connection between the remote UE and the relay UE is successfully established, and transmit a sidelink UE information message to the base station/network side. The message carries at least a destination identity used by the relay UE in an actual PC5 connection. Specifically, IE relay infor may be carried, and the IE includes at least two address identities:

one is a relay UE identity carried in a broadcast message by the relay UE or a relay UE identity received by the remote UE and carried in an RRC reconfiguration message, and the other is an address identity configured by an upper layer and used for sidelink transmission, the sidelink here being the sidelink mentioned herein and used by the remote UE to perform non-indirect connection.

On the basis of the above method, when performing operation 3, the remote UE may set the sidelink destination identity (sl-DestinationIdentity) therein to be an address identity configured by an upper layer and used for sidelink transmission. Since it is indicated in IE relay infor reported by the remote UE that the destination identity corresponds to a relay UE identity, the base station may indirectly learn that the address identity of the sidelink transmission corresponds to relay UE and preferably corresponds to U2N relay UE in multi-path.

In addition to operation 1, the UE may perform only operation 2 or operation 3, or may perform both operation 2 and operation 3, and the effect of the performing is not affected.

In addition, the present embodiment may also be implemented separately to report that a failure has occurred on a link between remote UE in a multi-path operation mode and relay UE.

If a connection means between the relay UE and the remote UE is based on Wi-Fi or another connection, similarly, when the remote UE detects that a link failure or a connection exception or abnormal releasing has occurred between the remote UE and the relay UE, the remote UE may use the method in the present implementation to report the information to the base station.

Embodiment 4

On the basis of Embodiment 3, when the remote UE detects that an SL-RLF has occurred on a connection between the remote UE and the relay UE, or an upper layer of the remote UE requests the remote UE to release a PC5-RRC connection between the remote UE and the relay UE, or the remote UE receives a PC5-RRC message (e.g., a NotificationMessageSidelink message) from the relay UE, and it is indicated in the message that the relay UE has detected a Uu interface RLF or the relay UE has been handed over, the UE may further determine whether the UE is configured with SRB1 via relay (or determine whether SRB1 is located on an indirect connection), and further determine whether the UE is configured with split SRB1.

If the UE is not configured with the SRB1 via relay (or SRB1 is not located on the indirect connection), and is not configured with split SRB1, the UE initiates an RRC connection re-establishment procedure.

If the UE is configured with the SRB1 via relay (or SRB1 is located on the indirect connection), or the UE is configured with split SRB1, the UE may perform one or more of the operations in Embodiment 3.

Embodiment 5

For UE operating in a multi-path mode, when the UE detects that a failure has occurred on a connection between the UE and a base station/network, e.g., detects a Uu RLF, the UE may further determine whether the UE is configured with split SRB1.

If the UE is configured with split SRB1, the UE may initiate a failure information reporting procedure. In the procedure, the UE generates a failure information (FailureInformation) message, and optionally, information such as an RLF having occurred on a link between the UE and the base station, or a direct connection failure having occurred, or a direct path failure is indicated in the message. In addition, the message is submitted to a lower layer for transmission, and is then transmitted to the base station via relay UE.

The UE initiates an RRC connection re-establishment procedure if the UE is not configured with split SRB1.

In addition, the present embodiment may also be implemented separately to report that a failure has occurred on a link between remote UE in a multi-path operation mode and a base station.

If a connection means between the relay UE and the remote UE is based on Wi-Fi or another connection, similarly, when the remote UE detects that a link failure or a connection exception or abnormal releasing has occurred on a direct connection between the remote UE and the base station, the remote UE may use the method in the present implementation to report the information to the base station via the relay UE.

Embodiment 6

UE may operate only in an indirect single-path mode, i.e., operating in a U2N relay mode. In order to implement a multi-path mode, a base station may transmit, to the UE, a handover command message or an RRC connection reconfiguration message including synchronization information. A target cell to which UE needs to perform downlink synchronization is specified in the message. However, different from a conventional handover command, it is further indicated in the command that the UE can maintain a current indirect path, or indicates that the UE does not need to release a current indirect path, so that the UE operates in the multi-path mode. Such indication may be implemented in any one of the following manners: For example, the reconfiguration message carries identification information of relay UE, and the identification information is identical to an identity of relay UE currently providing a relay service for the UE. Alternatively, a direct indication indicates that the UE does not need to release or maintain a relay connection.

Upon receiving the message, the UE starts T304, and performs synchronization to the target cell. When random access in the target cell is successfully completed, T304 is stopped. If T304 expires, and a reason for causing T304 to run is the establishment of a multi-path connection or path addition, the UE may initiate a failure information reporting procedure. In the procedure, the UE generates a failure information (FailureInformation) message, and optionally, information such as an RLF having occurred on a link between the UE and the base station, or a direct connection failure having occurred, or a direct path failure is indicated in the message. In addition, the message is submitted to a lower layer for transmission, and is then transmitted to the base station via relay UE.

Figure 5:
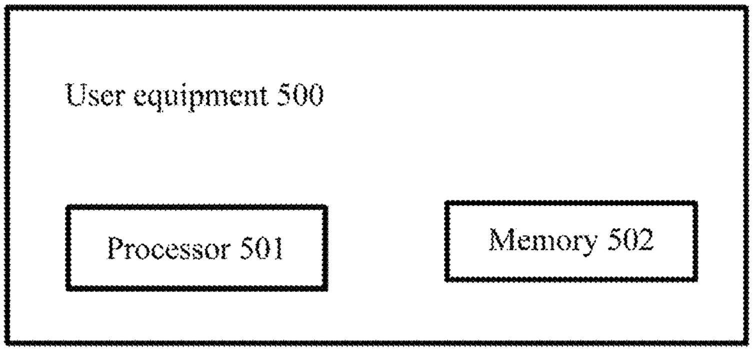
FIG. 5 is a simplified structural block diagram of user equipment according to the present invention.

FIG. 5 is a simplified structural block diagram of user equipment according to the present invention.

As shown in FIG. 5, the user equipment 500 includes at least a processor 501 and a memory 502. The processor 501 may include, for example, a microprocessor, a microcontroller, an embedded processor, and the like. The memory 502 may include, for example, a volatile memory (such as a random access memory (RAM)), a hard disk drive (HDD), a non-volatile memory (such as a flash memory), or other memory systems, etc. The memory 502 has program instructions stored thereon. When the instructions are run by the processor 501, one or several steps in the processing method for UE of the present disclosure can be performed.

The methods and related devices according to the present disclosure have been described above in conjunction with preferred embodiments. It should be understood by those skilled in the art that the method shown above is only exemplary, and the above embodiments can be combined with one another as long as no contradiction arises. The method of the present invention is not limited to the steps or sequences illustrated above.

The user equipment shown above may include more modules, for example, may also include modules that can be developed or developed in the future and can be used for base stations, MMEs, or UE, and so on. Various identifiers shown above are only exemplary, not for limitation, and the present disclosure is not limited to specific information elements serving as examples of these identifiers. A person skilled in the art could make various alterations and modifications according to the teachings of the illustrated embodiments.

It should be understood that the above embodiments of the present disclosure may be implemented through software, hardware, or a combination of software and hardware. For example, various components in the base station and user equipment in the above embodiments can be implemented by multiple devices, and these devices include, but are not limited to: an analog circuit device, a digital circuit device, a digital signal processing (DSP) circuit, a programmable processor, an application-specific integrated circuit (ASIC), a field-programmable gate array (FPGA), a complex programmable logic device (CPLD), and the like.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing the programs by a computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application-specific integrated circuits (ASICs), field-programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices mounted indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A remote user equipment (UE), comprising:
a processor; and
a memory storing instructions,
wherein the processor is configured by the instructions to cause the remote UE to:
receive a radio resource control (RRC) Reconfiguration message from a base station, the RRC Reconfiguration message including information to indicate a timer value and an identity of a relay UE;
start a timer with a time value set to the indicated timer value, a cause of stopping the timer being associated with a transmission, by the remote UE, of an RRCReconfigurationComplete message or a reception, by the remote UE, of an RRCReconfigurationCompleteSidelink message;
initiate a PC5 connection establishment with the relay UE with the indicated identity; and
initiate a failure information procedure to submit a first message to a lower layer for transmission, in response to determining that the timer expires without stopping due to the cause, the first message indicating information of indirect path failure.

2. The remote UE according to claim 1, wherein
the processor is further configured by the instructions to cause the remote UE to, in response to receiving a NotificationMessageSidelink message from the relay UE which indicates a Radio Link Failure (RLF) occurs in Uu interface, perform a plurality of operations, and
the operations include:
suspending indirect path transmission for all Signal Radio Bears (SRBs), and
initiating the failure information procedure to submit a second message to the lower layer for transmission, the second message indicating another information of indirect path failure.

3. The remote UE according to claim 1, wherein
the processor is further configured by the instructions to cause the remote UE to, in response to detecting a sidelink radio link failure on the PC5 connection, perform a plurality of operations, and
the operations include:
suspending indirect path transmission for all Signal Radio Bears (SRBs), and
initiating the failure information procedure to submit a second message to the lower layer for transmission, the second message indicating another information of indirect path failure.

4. The remote UE according to claim 3, wherein
the second message includes information indicating that the sidelink radio link failure has occurred on a link between the remote UE and the relay UE.

5. A method performed by a remote user equipment (UE), the method comprising:
receiving a radio resource control (RRC) Reconfiguration message from a base station, the RRC Reconfiguration message including information to indicate a timer value and an identity of a relay UE;
starting a timer with a time value set to the indicated timer value, a cause of stopping the timer being associated with a transmission, by the remote UE, of an RRCReconfigurationComplete message or a reception, by the remote UE, of an RRCReconfigurationCompleteSidelink message;
initiating a PC5 connection establishment with the relay UE with the indicated identity; and
initiating a failure information procedure to submit a first message to a lower layer for transmission in response to determining that the timer expires without stopping due to the cause, the first message indicating information of indirect path failure.

* * * * *